Patented July 2, 1940

2,206,454

UNITED STATES PATENT OFFICE 2,206,454

ANTIOXIDANT

David Craig, Silver Lake, Ohio, assignor to The B. F. Goodrich Company, New York, N. Y., a corporation of New York No Drawing. Application March 31, 1938, Serial No. 199,276

20 Claims. (Cl. 260—802)

This invention relates particularly to the art of rubber manufacture and especially to the preservation of rubber goods against deterioration, but includes also the preservation of other organic materials which tend to deteriorate by absorption of oxygen from the air such as fatty oils, cracked gasoline and other petroleum products, essential oils, soaps, synthetic plastics, and the like.

It is well known that many organic substances undergo a more or less rapid deterioration which is commonly ascribed to the action of atmospheric oxygen. It has heretofore been proposed to retard or inhibit this deterioration by adding a small proportion of a phenol, an aromatic base, or some other like substance, termed generally an "antioxidant."

The antioxidants of this invention are long open chain aromatic amines containing the condensed radicals of a diarylamine and of an aldehyde or ketone in such proportions that each molecule of the product contains at least two alkylidene radicals and at least three diarylamine radicals, but preferably not more alkylidene radicals than amine radicals, and may be represented (in the case of the simplest compounds) by the following schematic formula

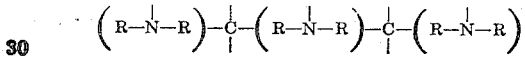

in which R represents an aromatic nucleus, and in which the free valencies on the nitrogens (when not occupied by the methylene carbons) are satisfied by hydrogen. The term "diarylamine radical" is used to refer to a radical formed by removing from one to three hydrogens from a diarylamine, not more than one hydrogen being removed from any aromatic nucleus or nitrogen atom. Thus when a diarylamine is represented by the formula

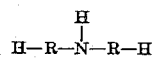

R representing an aromatic nucleus, the diarylamine radicals are

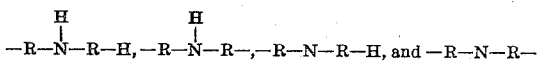

The term "alkylidene radical" is used to include cycloalkylidene radicals such as cyclohexylidene, since the alicyclic ketones react in essentially the same manner as the aliphatic compounds. Ordinarily the antioxidants of this invention will contain a predominating proportion of compounds of high molecular weight containing more than two alkylidene radicals and more than three amine radicals. If an aldehyde or ketone enters into the products in a proportion greater than that equivalent to the amine (and also if too high a temperature is employed, as will be pointed out below) heterocyclic bases will tend to be formed, rather than the open chain amines of this invention.

The aromatic nucleus represented by R may be any aromatic nucleus such as that of benzene or of its homologues such as toluene, xylene, cumene, etc. or of naphthalene, indane, biphenyl or the like, but the simpler aromatic nuclei and particularly benzene nuclei are at present preferred. The methylene carbon represented by C may be a simple methylene group (derived from formaldehyde) or may contain one alkyl substituent (derived from a higher aldehyde) or two alkyl substituents (derived from a ketone) or even a single alkylene group united to both free bonds (derived from a cyclic ketone), but the compounds derived from low molecular weight aldehydes and ketones such as foraldehyde, acetaldehyde, propionaldehyde, butyraldehyde, acetone, methyl ethyl ketone, methyl isopropyl ketone, methyl butyl ketone, and cyclohexanone, and particularly those derived from the simplest aldehyde and ketone, formaldehyde and acetone respectively, are at present preferred.

The compounds of this invention may readily be prepared from a diarylamine and an aldehyde or ketone as the case may be. A convenient method for preparing such a compound in a fair state of purity is to react one half of the aldehyde or ketone with a large excess of diarylamine (say four or more mols of amine for each mol of aldehyde or ketone used in this stage of the reaction) in the presence of an acidic catalyst, that is, a mineral acid or a compound which generates acid upon hydrolysis or upon contact with organic substances, such as hydrochloric acid, sulfuric acid, phosphoric acid, zinc chloride, stannic chloride, ammonium chloride, ammonium bromide and iodine. This stage of the reaction, as well as the second stage which will be described below, should be carried out at a relatively low temperature, below about 150° C., for at higher temperatures an entirely different type of reaction tends to take place with the production of heterocyclic bases rather than the open chain amines of this invention. Temperatures of from 100° to 150° are generally suitable. After the aldehyde or ketone has completely reacted, the excess amine is removed, for example by completely neutralizing the catalyst and distilling off the amine, leaving an intermediate of the type:

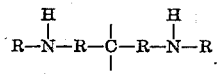

The remainder of the aldehyde or ketone (which may be the same as or different from that used in the first stage) is then added, either with or without an additional portion of acidic catalyst, and the mixture is again heated to a temperature not higher than about 150° C., whereupon the final product, which is the antioxident of this invention, is produced. This product is ready for immediate use, after removal of unreacted raw materials and catalysts, if present in appreciable proportions. Compounds of this type may also be prepared in a single stage reaction of a diarylamine with an aldehyde or ketone, but in this case a considerable proportion of the intermediate just referred to, as well as of unreacted amine, may appear in the product of the reaction, hence if their presence is undesirable they would have to be removed as by vacuum distillation, and used in the preparation of a subsequent batch.

The structure of the products depends somewhat upon the conditions under which the condensation is performed. Thus, when two mols of 2,2 di-(p-anilino phenyl) propane (prepared from diphenylamine and one mol of acetone) is heated with an additional mol of acetone at 140° C. for four hours in a neutral or very mildly acid environment, it is my belief that the product is an alkylidene diamine, and that the reaction proceeds according to the following equation:

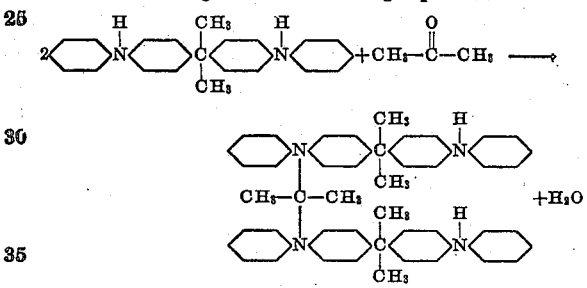

The product, which is believed to consist essentially of N,N' diphenyl, N,N' di(p-[2(p-anilinophenyl)isopropyl] phenyl) 2,2 diamino propane and similar compounds of higher molecular weight, is neutralized with an aqueous alkaline solution, and the unreacted materials are distilled off. The mixture of compounds which form the product is an excellent antioxidant, and may be used without further purification.

On the other hand, if the reaction is carried out in a strongly acid medium, the condensation tends to take place on the aromatic nucleus rather than on the amino nitrogen, and probably predominantly in the para position if it is free, although ortho substituted compounds are probably also formed. Thus, when two mols of 2,2 di(p-anilinophenyl) propane are reacted with one mol of acetone in the presence of two mols of concentrated hydrochloric acid, it is my belief that the reaction proceeds essentially in the following manner:

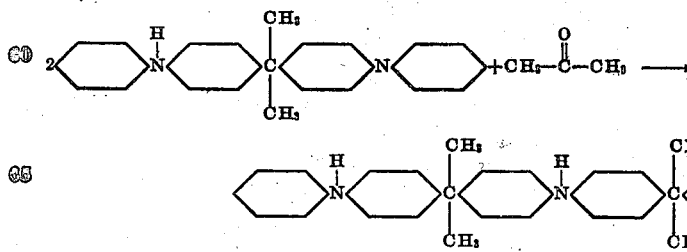

The product in this case may be called 2,2 di(p-[p - (2 - [p - anilinophenyl] isopropyl) - anilino] phenyl) propane. The product, after neutralization and removal of unreacted materials and low-boiling by-products, is an excellent antioxidant.

The antioxidants of this invention are for all practical purposes absolutely non-volatile. They all contain secondary amino groups and are all very active antioxidants, and for many purposes have the additional advantage that because of their high molecular weight and consequent low fugacity they do not tend to evaporate or bleed away from the place where they are needed.

Any of the antioxidants of this invention, and specifically either of the products prepared in the manner set forth above, may be employed to retard the deterioration of rubber either before or after vulcanization. It is generally preferred to incorporate the antioxidant into the rubber before vulcanization, in proportions of from about 0.1% to 5% of the weight of rubber used. For example, a tire tread composition containing 100 parts by weight of rubber, 45 parts of carbon black, 5 parts of zinc oxide, 2 parts of pine tar, 2 parts of stearic acid, 3.25 parts of sulfur, 0.5 part of vulcanization accelerator such as polybutylidene aniline, and 1 part of one of the antioxidants of this invention, when vulcanized 60 minutes at 295° F. to produce an optimum cure resists deterioration for approximately twice as long as the composition without the antioxidant. The formation of cracks upon rapidly repeated flexing is also greatly retarded by the incorporation of even 1 part of one of the antioxidants of this invention.

Any of the antioxidants within the scope of this invention may be similarly employed in any type of rubber composition, such as those used for automobile tires and tubes, hose, belting, sheet and thread rubber, rubberized fabrics, molded goods, seamless dipped goods, boots and shoes, etc. whether vulcanized in a mold, in open steam, in hot air, or even vulcanized in the cold by the so-called acid process. The proportion of antioxidant may vary from about 0.1% to 5%, although either smaller or greater proportions may be found useful, and it may be added to the rubber or other substance at any desired state of the preparation of the product. If the material to which it is added is a liquid such as rubber cement, latex, cracked gasoline, or an oil, the antioxidant may simply be dissolved or suspended therein in a suitable small proportion, say 0.2% by weight. It is accordingly to be understood that the term "treating" is employed in the appended claims in a generic sense to embrace the incorporation of the antioxidant into a solid substance by milling or mastication, its addition to an aqueous dispersion such as rubber latex in a finely dispersed form, its solution in liquids, and any equivalent methods such as applying it to the surface of vulcanized or unvulcanized rubber in the form of a powder, paste, or solution.

The term "rubber" unless otherwise limited is likewise employed in a generic sense to include caoutchouc, balata, gutta-percha, reclaimed rubber, synthetic rubber, artificial rubber isomers, and like products, whether vulcanized or unvulcanized and whether or not admixed with fillers, pigments, vulcanizing and accelerating agents.

While I have herein disclosed certain specific embodiments of my invention, I do not intend to limit myself solely thereto, for many modifications including substituting materials having equivalent chemical properties and varying the proportions of materials used are within the spirit and scope of the invention as defined in the appended claims.

I claim:

1. The method of retarding the deterioration of an organic substance which tends to deteriorate by absorption of oxygen from the air which comprises treating the said substance with an open-chain aromatic amine consisting of at least three diarylamine radicals joined by a smaller number of alkylidene radicals.

2. The method of preserving rubber which comprises treating rubber with an open-chain aromatic amine consisting of at least three diarylamine radicals joined by a smaller number of alkylidene radicals.

3. The method of preserving rubber which comprises treating rubber with the product obtained by condensing at not over 150° C. a member of the class comprising aliphatic aldehydes and ketones with at least an equimolar amount of a compound containing two diarylamine radicals joined by an alkylidene radical.

4. The method of preserving rubber which comprises treating rubber with the product obtained by condensing at not over 150° C. acetone with at least an equimolar amount of a compound containing two diarylamine radicals joined by an alkylidene radical.

5. The method of preserving rubber which comprises treating rubber with the product obtained by condensing at not over 150° C. one mol of acetone with approximately two mols of a compound containing two diarylamine radicals joined by an alkylidene radical.

6. The method of preserving rubber which comprises treating rubber with the product obtained by condensing, at not over 150° C. in the presence of an acidic catalyst, acetone with at least an equimolar amount of a compound containing two diarylamine radicals joined by an alkylidene radical.

7. The method of preserving rubber which comprises treating rubber with an open-chain aromatic amine consisting of at least three diarylamine radicals joined by a smaller number of alkylidene radicals through carbon to carbon bonds.

8. The method of preserving rubber which comprises treating rubber with an open-chain aromatic amine consisting of at least three diarylamine radicals joined by a smaller number of alkylidene radicals through carbon to nitrogen bonds.

9. The method of preserving rubber which comprises treating rubber with the product obtained by reacting, at not over 150° C., acetone with at least an equimolar amount of 2,2 di(p-anilinophenyl) propane.

10. The method of preserving rubber which comprises treating rubber with the product obtained by reacting, at not over 150° C. in the presence of an acidic catalyst, one mol of acetone with approximately two mols of 2,2 di(p-anilinophenyl) propane.

11. The method of preserving rubber which comprises treating rubber with the product obtained by reacting, at not over 150° C., one mol of acetone with approximately two mols of a di-anilinophenyl alkane.

12. The method of preserving rubber which comprises treating rubber with the product obtained by reacting, at not over 150° C. in the presence of concentrated hydrochloric acid, one mol of acetone with approximately two mols of 2,2 di(p-anilinophenyl) propane.

13. A rubber composition comprising rubber and an open-chain aromatic amine consisting of at least three diarylamine radicals joined by a smaller number of alkylidene radicals.

14. A rubber composition comprising rubber and the reaction product defined in claim 3.

15. A rubber composition comprising rubber and the reaction product defined in claim 4.

16. A rubber composition comprising rubber and the reaction product defined in claim 6.

17. A rubber composition comprising rubber and an open-chain aromatic amine consisting of at least three diarylamine radicals joined by a smaller number of alkylidene radicals through carbon to carbon bonds.

18. A rubber composition comprising rubber and an open-chain aromatic amine consisting of at least three diarylamine radicals joined by a smaller number of alkylidene radicals through carbon to nitrogen bonds.

19. A rubber composition comprising rubber and the reaction product defined by claim 10.

20. A rubber composition comprising rubber and the reaction product defined by claim 11.

DAVID CRAIG.